March 3, 1942. C. R. RUSE 2,275,319
DUAL USE SIGN AND EXHIBITION DEVICE
Filed July 12, 1939
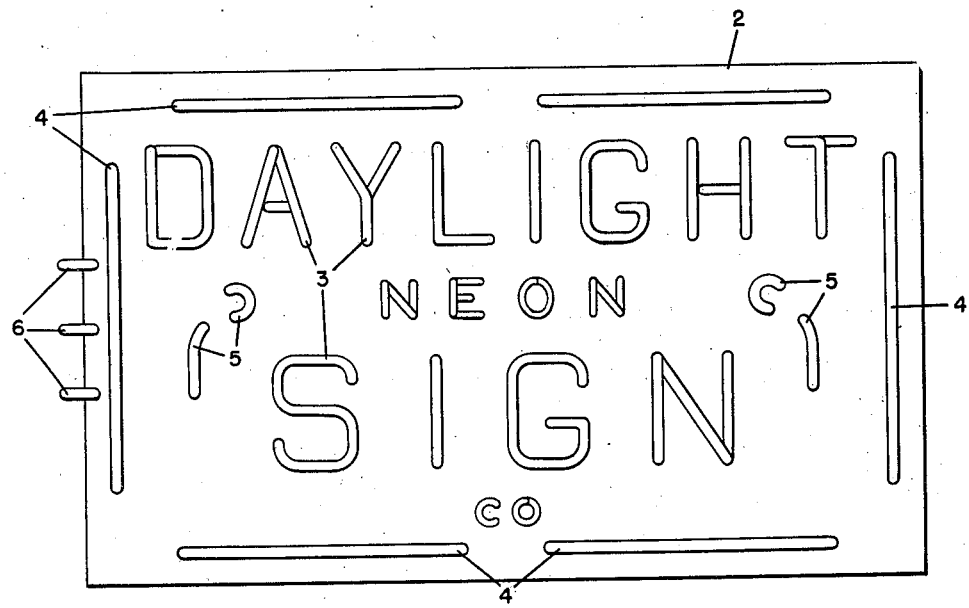
Fig.1
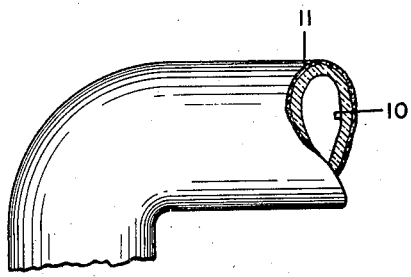
Fig.2
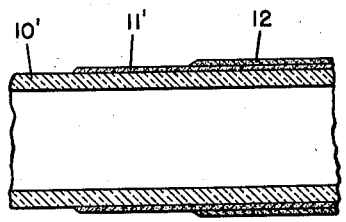
Fig.3
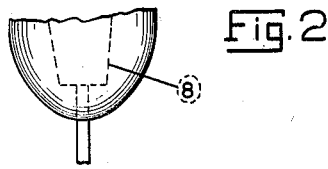
INVENTOR.
CARL R. RUSE
BY *Oberlin, Limbach & Day*
ATTORNEYS.

UNITED STATES PATENT OFFICE 2,275,319

DUAL USE SIGN AND EXHIBITION DEVICE

Carl R. Ruse, Toledo, Ohio, assignor to Plastic Lights, Inc., Toledo, Ohio, a corporation of Ohio Application July 12, 1939, Serial No. 284,037

8 Claims. (Cl. 40—130)

The familiar neon type of sign, while having certain advantages which have contributed to its general usage, is subject to the very serious drawback that the neon tube is practically invisible in daylight when the electric current is off, and it is necessary to either use electric current continuously or else forego the utility of the sign except when it is energized. In an effort to meet this difficulty, various elaborate forms of background or auxiliary sign elements have been introduced, but the fundamental non-visibility of the neon tube has merely resulted in such efforts being a provision of two signs, one the neon tube when it is energized, and the other the special visible background sign when the tube is not energized. Some attempts have also been made to modify the normal glass tubing by frosting it internally, or by substituting opal glass tubing instead of the customary clear glass. Frosting however does not help sufficiently for daylight visibility. It results in a dull surface appearance which has little visibility except at very close range, and besides when the tube is energized the frosting by its roughening of the surface by its multitudinous irregular facets occasions an unfavorable loss of efficiency from minute-cross reflection. Opal glass tubing is again not sufficiently visible at a distance when the tube is off circuit, and when the tube is on circuit the result on the light rays is not all that could be desired, apparently by reason of the minute crystal particles which form the opalescence in the glass body having the proclivity of irregularly cross-reflecting and refracting the light rays. The use of special glasses has also been extended to substitution of colored glass for the tubing, in some instances multi-color or striped, but this merely modifies the light emitted, and colored glass tubes have no better visibility at a distance than plain glass when the electric current is off. All special glasses moreover have the objection of being less satisfactorily workable to form intricate shapes and designs than the customarily easily-worked plain lead glass. Efforts also have been made to decrease the loss of light at the back of the tube by applying at that region a reflective medium or backing so as to reflect insofar as possible the rays therefrom to and through the clear glass tube. Withal, the fundamental difficulty has persisted, that a neon sign is of utility only when the electric current is on, and it has little value for daylight use or when the current is off. In accordance with the present invention however, it now becomes possible to realize the advantages of the neon type of sign, and in addition obtain a daylight utility or sign value with reflected light, thereby adding to the novelty of the sign, as well as resulting in saving of current.

It is old to coat tubing with cold mixtures but the composite tube produced will not serve efficiently because of peeling, flaking and/or cracking. The coating of the present invention is as permanent as the tube itself and can even be applied to the tube before it is bent into letters or other characters.

To the accomplishment of the foregoing and related ends, the invention, then, comprises the features hereinafter fully described, and particularly pointed out in the claims, the following description and the annexed drawing setting forth in detail certain illustrative embodiments of the invention, these being indicative however, of but a few of the various ways in which the principle of the invention may be employed.

In said annexed drawing:

Fig. 1 is an elevational view of a sign illustrating the invention; Fig. 2 is a fragmentary section of the light tube; and Fig. 3 is a fragmentary longitudinal section showing further detail thereof.

The sign to have luminous letters or elements is formed of glass tubing, such glass or envelop being easily workable in a gas flame to form desired shapes for the elements of the advertising sign as may be desired in any given instance. Usually a letter or group of letters is contoured of the tubing, or various ornamental shapes or straight runs, as desired, the sections of the tubing being provided with electrodes and connections for high tension electric current as well known, and being mounted on a suitable support. Such transparent glass elements however are in accordance with my invention rendered visible for daylight usage, by being provided with a surface to reflect external light, the tube thereby standing out as a visible element under ordinary light conditions with the electric current off. The surfacing provided is furthermore of a character which transmits the light from within when the tube is energized. Signs of such structure are accordingly luminous at night or when the current is on, and are visible by reflected light when the current is off. Thus, a sign need not have elaborate backing and accessory lettering, but may be mounted on a support 2, Fig. 1, which may be of any desired form for the purpose and effects desired, from simple support means preventing cross-view to more elaborate decorative provisions, and the sign elements or letters 3 are mounted thereon. The visibility-surfacing, in a preferred embodiment of the invention is a surfacing or coating of vitreous enamel, particularly a borax-feldspar-fluoride-silica fusible enamel. This material in its initial condition as a ground mixture of the constituents brought into liquid form by a suitable vehicle, such as water with suspending Vallender clay or the like or with the addition of a gum such as gum arabic, can by reason of its liquid condition, be readily applied to the tube in any convenient way, as for instance by dipping, spraying, or brushing if it is accomplished with care to prevent brush marks. The initial enamel mixture or suspension having been applied, it must be heat treated or baked to bring it into permanent form. Straight tubing of desired stock sizes may be coated, or the tubing after it has been worked into the desired shapes of letters or designs may be coated. For the heat treating, the coated tubes are subjected to a suitable temperature, for instance in the case of the type of enamel just referred to, a temperature of about 1000° F. to 1050° F., or 524° C. to 551° C., this being applied in a suitable kiln or oven, the arrangement for the exposure to the heat being such that the coated tubes may be exposed merely long enough to fuse the enamel, which permanently unites it to the tube. The difference in melting point of the enamel and the glass tubing favors the fusing of the enamel without detriment to the tubing and especially by control of the time to the few minutes exposure requisite to fuse the enamel, such fusing and maturing of the reactions between the enamel constituents is accomplished before the glass tubing reaches a temperature to occasion its softening, to such an extent that the tubes will be unduly distorted. It is, however, softened upon the outer surface as distinguished from softening to a degree where the tube flattens or bends severely out of axial alinement. I have found that a vitreous enamel suitably applied not only provides an excellent visibility for the so coated tube, by reason of its high reflecting quality for external light and the smooth surface with its rounded or cylindrical form catching the external light rays at diverse angles, but also surprisingly, such coating is highly transmissive of the light rays from within when the tube is energized by the electric current flow. Furthermore, the coating will not peel or crack as is the case with cold coatings. The color of the enamel coating may be plain white or by inclusion of appropriate oxides or ceramic colors, different surface colors may be provided such as to blend with or contrast or modify the color of the light emitted by the gas within as energized or bombarded during flow of the electric current. As well known, a neon-filled tube emits a red color, helium a pinkish white, argon a purple color, and by inclusion of other elements such as mercury etc. blues and greens etc. are had. And, by including coloring agents as above indicated in the enamel, the coating may determine the final effect as desired, both for daylight or reflected light, and for transmitted light as emitted from within. The detail variations in compositions of vitreous enamel are well known in the enameling industry as it is customarily practiced in applying enamels to sheet metal and other metal articles, and the present invention involves the surprising discovery that both reflected light from the exterior and transmitted light from the interior of an energized gas filled tube or sign may be turned to effective visibility for such sign usage both by daylight and by energization of the tube. A priori, from the experience in the enameling industry it would be supposed that a coating of material on such order would entirely prevent emission of light from within. As illustrating more particularly coatings such as may be employed, one convenient formula is borax 34.4 parts by weight, boric acid 4.3, feldspar 34.6, quartz 19.1, aluminum oxide 3.2, and fluorspar 3.5. Another for instance is borax 38.2, feldspar 28.2, quartz 20.3, soda ash 10.2 and cryolite 2.2. Another is borax 34.9, feldspar 28.9, quartz 12.0, soda ash 5.3, nitre cake 13.2, aluminum oxide 2.6, and sodium silicofluoride 3.0. Another for instance is borax 32.0, feldspar 33.2, fluorspar 2.12, cryolite 2.12, flint 30.5, and tin oxide 7.0. Another instance is borax 29.64, feldspar 30.78, fluorspar 3.0, cryolite 2.0, flint 28.22, sodium carbonate 2.38, and zinc oxide 5.0. By including a considerable lead content, the enamel may have the same expansion and contraction characteristic as the lead glass tubing upon which it is applied. For instance, with borax 6.9 parts, feldspar 3.9, quartz 20.7 and fluorspar 9.1, a lead oxide or red lead in amount of 55.3 parts may be incorporated. Excess of red lead not reacting into the silicate may furnish coloring as desired. It will be understood that these mineral mixtures as fine ground powder are incorporated in the water, and alcohol if desired, and suspending medium as described foregoing, and for colors other than white there may be added coloring oxides or ceramic colors as desired.

Thus, the letters or other characters or tube forms as desired for the sign are shaped from the glass by heating and bending as well known, and the coating is applied to the portions desired, and the enamel is then heat treated as above-pointed out to produce a permanently fused coating. Electrodes 8 are sealed in the ends of the tube, and the tube is connected to a vacuum pump by a tubulation coupling customarily provided, as near one end, and the tube is evacuated and a high tension electric current is applied to the electrodes as the proper amount of neon, helium or such gas is introduced into the tube, and the tubulation connection is then sealed off, as in the known practice of tube making. The letters 3, Fig. 1, and the straight tube elements 4, and other forms 5, 6, etc., are then mounted on a support 2 with electric connections, as known in the neon sign art. Instead however of having to provide accessory letters and visible duplicating elements back of the tube elements in order to form a sign that can be seen in daylight, the present construction requires no such accessories, and the tubes 3, 4, etc. show as effective visible elements by light reflecting therefrom. When the electric current is turned on, the light from the luminous gas within shines through the enamel and the tube elements are thereby visible for night operation, or if current usage in daytime is desired. If ceramic colors have been incorporated in the coating composition, the appearance of the tube elements is correspondingly in colors as desired, for instance yellow, orange, red, green, blue, etc., the enamel giving a clear brilliant visibility without or with the current on, and with the current on giving a particularly full and clear illumination without the confusing dazzle-glare customary in plain neon tubes.

In some cases, the coating may be formed of finely divided mineral, such as titanium dioxide and antimony oxide and an enamel body be provided therewith by enamel "Bakelite" or like synthetic resin and a liquid vehicle solvent, the mineral components or oxides being in amount for instance 20–30 per cent with the resin and solvent, and this may be coated onto the tubes as previously described. Similarly, the tube is baked, but a lower temperature is employed, and the electrodes and gas filling are provided as indicated. Such coatings, while very weather-resistant, do not have the long-time durability of the borax-feldspar or higher temperature coatings.

One or more layers of enamel may be applied. Thus, as shown in Fig. 2, the glass tube 10 has one enamel coat 11. A superposed coat 12, Fig. 3, can be in fact employed to further modify the visual appearance of a tube, particularly as to the emitted light when the tube is on circuit, and a distinctive effect is observed between the portions having the coating 12, in contrast to one coating 11'. With modifications available in this manner, and the various effects possible with different colors in the enamel, and in the luminous gas, a wide range of artistic and striking effects is possible for a sign maker.

It will be observed also that by coating with black enamel the cross-overs or connections in a neon sign unit can be opaqued or obliterated from view such as to be permanent, since such coating is as durable as the glass tube. This represents a particularly practical advance in the art, since the black paints and lacquers which have been used on the connections heretofore soon burn or weather off and give a very detrimental appearance.

Units in accordance with the invention are characterized particularly by their outstanding visibility as seen by daylight or reflected light, with the current off, and when the current is on the illumination from within is especially effective also by reason of the enamel providing efficient transmission of the light while yet uniformizing its distribution and mollifying distracting glare.

Signs made up in accordance with my invention can be used indoors or outdoors without any danger of peeling or cracking because the vitreous coating is integrally fused to the tube and lasts as long as the tube. In addition, since the coefficient of expansion of the tube and coating are the same, peeling and cracking is prevented, which is prone to occur with cold coatings. The coating, being vitreous, is just as durable as the tube itself.

Other modes of applying the principle of the invention may be employed, change being made as regards the details described, provided the features stated in any of the following claims, or the equivalent of such, be employed.

I therefore particularly point out and distinctly claim as my invention:

1. A dual use sign comprising a glass tube shaped in its longitudinal dimension for a predetermined visual indication and reflecting external light by an exterior surfacing of a vitreous enamel to also transmit light from within, said tube having electrodes and containing a gas which is luminous as energized by a high tension electric current, said surfacing being integrally and permanently fused to the forward portion of said glass tube and being as durable as the tube.

2. A dual use sign comprising a glass tube shaped in its longitudinal dimension for a predetermined visual indication and reflecting external light by an exterior surfacing in part of plural coatings of a vitreous enamel to also transmit light from within, said tube having electrodes and containing a gas which is luminous as energized by a high tension electric current, said surfacing being integrally and permanently fused to the forward portion of said glass tube and being as durable as the tube.

3. A dual use sign comprising a glass tube shaped in its longitudinal dimension for a predetermined visual indication and reflecting external light by an exterior surfacing of a vitreous enamel embodying borax, feldspar, silica, metal fluoride, alkali and metal oxide, to also transmit light from within, said tube having electrodes and containing a gas which is luminous as energized by a high tension electric current.

4. A dual use sign comprising a glass tube shaped in its longitudinal dimension for a predetermined visual indication and reflecting external light by an exterior surfacing of a vitreous, heat treated, permanently fused, enamel to also transmit light from within, said tube having electrodes and containing a gas which is luminous as energized by a high tension electric current, said coating being translucent when said gas is energized.

5. A dual use sign comprising a glass envelop reflecting external light by an exterior forward surfacing of vitreous, heat treated, permanently fused, enamel, electrodes in said envelop, and sign-supporting means, said coating being translucent when said electrodes are energized.

6. A unit of the character described, visible in daylight with a clear glass envelop and a surfacing thereon of vitreous enamel embodying borax, feldspar and a fluoride, to also transmit light from within, electrodes in said tube and a gas which is luminous as energized by high tension electric current, said surfacing being capable of reflecting external light.

7. A unit of the character described comprising a luminous gas filled tube of glass and a coating on the exterior of the tube of enamel having substantially the same coefficient of expansion and contraction characteristic as the glass tube, said coating being permanently fused to the tube and being as durable as the tube.

8. A unit of the character described comprising a luminous gas filled tube of lead glass and a coating on the tube of lead-containing heat-treated, permanently fused vitreous enamel, said coating being capable of reflecting external light and also being translucent when said gas is energized.

CARL R. RUSE.